Patented Mar. 20, 1951

2,546,130

UNITED STATES PATENT OFFICE 2,546,130

QUICK-DRYING WRITING INKS

Raymond L. Mayhew, Phillipsburg, N. J., assignor to General Aniline & Film Corporation, New York, N. Y., a corporation of Delaware No Drawing. Application May 29, 1948, Serial No. 30,211

3 Claims. (Cl. 106—20)

This invention relates to the preparation of greenish-blue writing inks of the quick-drying type.

It is known to prepare brightly colored quick-drying inks by the use of dyestuffs and caustic alkali, the penetrative quality of the caustic alkali causing the ink to be rapidly absorbed by the paper. Up to the present, however, a commercially satisfactory greenish-blue writing ink of this kind has not been produced. This has been due to the instability to caustic alkali of the dyestuffs heretofore employed in the formulation of the inks, the dyestuffs undergoing breakdown during storage to decomposition products which either caused sludge formation in the ink or gave a color thereto radically different in shade from that of the original solution of the dyestuff.

It is an object of the present invention to provide greenish-blue caustic alkali-containing quick-drying writing inks of improved color stability. Further objects will become apparent as the description proceeds.

I have found that the above objects may be accomplished by employing as dyestuffs for quick-drying writing inks of the aforementioned type, certain dilute aqueous caustic alkali-soluble derivatives of copper phthalocyanines of the benzene series.

The term copper phthalocyanines of the benzene series as used herein means tetraazaporphins in which each of the four pyrrole nuclei is fused to a phenylene nucleus and copper is contained in the molecule in complex combination.

The dyestuffs for the inks of the present invention are copper phthalocyanines of the benzene series containing attached to the phenylene nuclei of the phthalocyanine molecule a plurality of sulfonanilide groups. They may be prepared by reacting aniline in water suspension with the corresponding copper phthalocyanine polysulfonylchlorides at about room temperature, a suitable acid binding agent such as sodium carbonate being present. The number of these sulfonanilide groups will vary depending on the number of sulfonylchloride groups on the phenylene nuclei of the starting copper phthalocyanine. In some instances the dyestuffs may contain attached to the phenylene nuclei, in addition to the sulfonanilide groups, one or more sulfonic acid groups, either free or in the form of the aniline salt, or other substituents, such as halogen atoms, e. g., chlorine, or amino or carboxy groups, etc. By introducing a sufficient number of these sulfonanilide groups onto the phenylene nuclei, copper phthalocyanine sulfonanilides may be obtained which are soluble in dilute aqueous caustic alkali, e. g., sodium, potassium or lithium hydroxide, etc.

The starting copper phthalocyanine polysulfonylchlorides employed in the preparation of the dyestuffs may be obtained by reacting chlorosulfonic acid with the corresponding copper phthalocyanines at an elevated temperature as described in USP 2,219,330. They may also be made from the corresponding copper phthalocyanine polysulfonic acids or their salts by treatment with phosphorous pentachloride.

The following specific example is illustrative of the preparation of the dyestuffs. Parts are by weight.

Example

Ten parts of copper phthalocyanine tetrasulfonylchloride is stirred as a dry powder into a water suspension of aniline and while stirring at room temperature a 10% sodium carbonate solution is added until the reaction is alkaline. Stirring is continued for several hours at room temperature, whereupon the resulting dyestuff may be isolated by evaporation of the solution to dryness.

Quick-drying inks may be prepared in accordance with the invention by dissolving a small amount of one of the copper phthalocyanine sulfonanilides in a dilute aqueous solution of a caustic alkali, e. g., sodium, potassium or lithium hydroxide. Sodium hydroxide generally is to be used because of its lower cost. The concentration of the dyestuff and caustic alkali may be varied depending on the depth of shade and rate of drying desired in the ink. The caustic alkali should be used in concentrations corresponding to those disclosed in USP 1,932,248 and, described in terms of sodium hydroxide, it should not be below 0.5% and generally may be about 0.8% to about 2½% or slightly more.

Other ingredients found desirable in the art and which do not interfere with the functioning of the dyestuffs may be contained in the inks. As described in the aforesaid USP 1,932,248, starch may be used for preventing feathering of the ink on the paper, bentonite for improving its flow characteristics and, where required by usage in the trade for greater permanency, alkali soluble metal salts which on exposure to light give colored oxides, e. g., ammonium metavanadate or potassium ferro-cyanide. Small amounts, a fraction of one percent by weight on the ink, of wetting agents resistant to dilute caustic alkali may be used to further speed up the absorption of the ink by the paper. The amount of the wetting agent should not be great enough to cause feathering of the ink which, in each case, can be determined by simple test. A hygroscopic agent, such as sorbitol, glycerol, etc., may be added to the ink to keep the point of the pen moist when exposed to the atmosphere.

A specific formula for the preparation of quick-drying writing inks in accordance with the invention is as follows:

Copper phthalocyanine sulfonanilide
(product of example) _____ Three parts
Sodium hydroxide _____ Two parts
Sodium N-oleyl-N-methyl
taurate _____ Fraction of one part
Glycerol _____ One part
Water _____ 100 parts The above solution represents an attractive greenish-blue writing ink of excellent stability. It is permanent in character and the writing therefrom is still legible after soaking the paper in water for 24 hours.

As various other embodiments of the invention will occur to those skilled in the art, it is not intended that the scope of the patent be limited except as is required by the prior art and the appended claims.

I claim:

1. A quick-drying writing ink comprising in solution a copper phthalocyanine of the benzene series having attached to the phenylene nuclei a plurality of sulfonanilide groups, a hygroscopic polyhydric alcohol, water and caustic alkali, the content of caustic alkali in the ink being equivalent to from about one-half to two and one-half percent of sodium hydroxide.

2. A quick-drying writing ink as defined in claim 1, wherein the solution contains a wetting agent.

3. A quick-drying writing ink as defined in claim 2, wherein the caustic alkali is sodium hydroxide.

RAYMOND L. MAYHEW.

REFERENCES CITED

The following references are of record in the file of this patent:

UNITED STATES PATENTS

| Number | Name | Date |
|---|---|---|
| 2,173,699 | Siegel | Sept. 19, 1939 |
| 2,361,009 | Carman | Oct. 24, 1944 |
| 2,426,194 | Fischbach et al. | Aug. 26, 1947 |

FOREIGN PATENTS

| Number | Country | Date |
|---|---|---|
| 520,199 | Great Britain | Apr. 17, 1940 |

OTHER REFERENCES

Ellis, "Printing Inks" (1940), pages 221 and 280.